United States Patent [19]

Miwa et al.

[11] Patent Number: 5,023,298

[45] Date of Patent: Jun. 11, 1991

[54] CURABLE COMPOSITION

[75] Inventors: Hiroshi Miwa, Itami; Yoshitaka Okude, Hirakata; Masakazu Watanabe, Toyonaka; Sakuichi Konishi, Ikoma, all of Japan

[73] Assignee: Nippon Paint Co., Ltd., Osaka, Japan

[21] Appl. No.: 457,939

[22] Filed: Dec. 27, 1989

[30] Foreign Application Priority Data

Dec. 28, 1988 [JP] Japan ................................ 63-331572
Aug. 28, 1989 [JP] Japan ................................ 1-220605

[51] Int. Cl.$^5$ ............................................ C08L 83/00
[52] U.S. Cl. .................................... 525/103; 525/446;
525/476; 525/474; 525/100; 526/279; 528/41;
528/26; 528/26.5; 528/27
[58] Field of Search ................... 528/41, 26, 26.5, 27;
526/279; 525/446, 100, 476, 474, 103

[56] References Cited

U.S. PATENT DOCUMENTS 4,327,200  4/1982  Leitner et al. ...................... 528/111
4,550,146 10/1985  Paar et al. .......................... 528/111

*Primary Examiner*—Paul R. Michl
*Assistant Examiner*—Karen A. Hellender
*Attorney, Agent, or Firm*—Wenderoth, Lind & Ponack

[57] ABSTRACT

Disclosed is a curable composition which is superior in chemical resistance and weather resistance and appearance by the use of oxazolidine compounds, comprising (A) a compound having a carboxylic anhydride group, (B) an oxazolidine compound and (C) a polymer containing an alkoxysilyl group. An epoxy compound (D) may be added to the composition.

11 Claims, No Drawings

CURABLE COMPOSITION

FIELD OF THE INVENTION

The present invention relates to a curable composition superior in solvent resistance, chemical resistance and durability, in particular to a curable composition suitable for paint.

BACKGROUND OF THE INVENTION

Melamine resins and polyisocyanate compounds have been used as curing agents for thermosetting paints but they showed problems in chemical resistance, toxity to human body and the like.

In order to solve these problems, the use of blocked amines has been proposed, but it is difficult to obtains curable compositions having superior properties. For example, Japanese Kokai Publication (unexamined) discloses a hydraulic composition which comprises acid anhydride polymers and polyoxazolidines, but this composition is insufficient in chemical resistance and weather resistance and does not exhibit a superior finishing appearance.

SUMMARY OF THE INVENTION

The present invention provides a curable composition which is superior in chemical resistance and weather resistance and appearance by the use of oxazolidine compounds. Accordingly, the present invention provides a curable composition which comprises (A) a compound having a carboxylic anhydride group, (B) an oxazolidine compound and (C) a polymer containing an alkoxysilyl group. If an epoxy compound (D) is further added to this composition, the solid content of the composition is increased and other properties are improved.

Component (A)

The compound having a carboxylic anhydride group used in the present invention can be any which are used in this field. Examples of the compounds are low molecular weight acid anhydrides, such as maleic anhydride, phthalic anhydride, hydrogenated phthalic anhydride, 4-methyl-hydrogenated phthalic anhydride, pyromellitic anhydride, triglyceride of pyromellitic anhydride, ethylene glycol ester of trimellitic anhydride or mixtures thereof; high molecular weight acid anhydrides, such as copolymers of ethylenic acid anhydrides (e.g. itaconic anhydride and maleic anhydride) and other copolymerizable monomers; and the like. Examples of the other copolymerizable monomers are styrene, α-methylstyrene, esters of acrylic acid (for example methyl acrylate, ethyl acrylate, butyl acrylate or 2-ethylhexyl acrylate), esters of methacrylic acid (for example methyl methacrylate, ethyl methacrylate, butyl methacrylate, isobutyl methacrylate, t-butyl methacrylate, 2-ethylhexyl methacrylate or lauryl methacrylate), acrylamide, methacrylamide and the like. The copolymerization is conducted by the known methods, for example the radical polymerization method and the like. A number average molecular weight of the copolymer is within the range of 500 to 40,000, preferably 1,000 to 20,000. If the number average molecular weight is larger than 40,000, a viscosity of the copolymers is increased, whereby a disadvantage occurs in that a high solid thermosetting composition is hard to obtain. If the number average molecular weight is less than 500, the curing properties are insufficient. The molecular weight is determined by the GPC method.

An acid value of the high molecular weight acid anhydride is preferably within the range of 30 to 500, preferably 50 to 350. If the compound having a carboxylic acid anhydride group (hereinafter referred to as "acid anhydride") is classified into monobasic-, dibasic- and tribasic compounds on the basis of number of acid anhydride groups, the use of polybasic acid anhydrides other than monobasic acid anhydrides is preferable because the enhanced curing properties can be obtained. The preferable acid anhydride include an ethylene glycol ester of trimellitic anhydride, a triglyceride of trimellitic anhydride and a hydrogenated one thereof or a high molecular weight acid anhydride.

Component (B)

The oxazolidine compound employed in the present invention is obtained by a reaction between an alkanolamine compound containing a primary amine or secondary amine and a ketone or aldehyde. The "oxazolidine" according to the present invention may include an oxazolidine which has 5-member ring and a tetrahydro-oxazine which has 6-member ring. This compound can be obtained by the dehydration reaction of polyfunctional alkanolamines and ketones or aldehydes. The polyfunctional alkanolamines are prepared by a reaction of an alkanolamine, such as mono- or diethanolamine, mono- or dipropanolamine, mono- or diisopropanolamine and ¹N-methylethanolamine, and both-end primary amines (for example, ethylenediamine, hexamethylenediamine and isophorone diamine) and epoxy compounds (for example, ethylene oxide, buthylene oxide and the like). Examples of the ketones or aldehydes are acetone, methylethylketone, methylisobutylketone, cyclohexanone and isophorone, benzaldehyde, isobutylaldehyde, acetoaldehyde, propyonaldehyde and n-butylaldehyde. In addition, the polyfunctional oxazolidine compounds can be obtained by the reactions of an oxazolidine compound having a hydroxylic group, which are obtained by the dehydration of alkanolamines (such as diethanolamine and diisopropanolamine) by means of the above described ketones and aldehydes, with various kinds of reactive compounds or acid chlorides. The reactive compounds include isocyanate compounds, for example, hexamethylene-diisocyanate, isophronediisocyanate, 1,3-(isocyanatemethyl)cyclohexane and the like. In addition, the acid chlorides include azipoyl dichloride, sebacoyl dichloride, decaloyl dichloride, terephthaloyl dichloride and the like. The oxazolidine compound of the present invention also includes a compound represented by the following formula [I]:

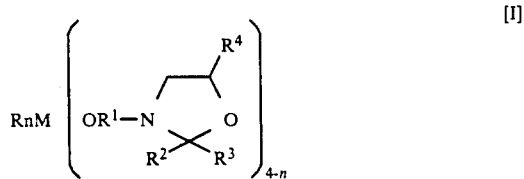

wherein R is a hydrogen atom, an alkyl group, an aryl group, a vinyl group, a halogenated alkyl group or alkoxylic group containing 1 to 10 carbon atoms; n is an integer of 0 to 3; M is a silicon or titanium atom; $R^1$ is an alkyl group containing 2 to 5 carbon atoms; $R^2$ and $R^3$ is a hydrogen atom, an alkyl group or an aryl group containing 1 to 10 carbon atoms, respectively; and $R^4$ is a hydrogen atom or a methyl group.

The oxazolidine compounds represented by the above described formula [I] can be obtained by the reaction between compounds represented by the following formula [II]:

wherein R, n and M are same as in the formula [I]; X is a halogen atom, and hydroxyoxazolidine compounds represented by the following formula [III];

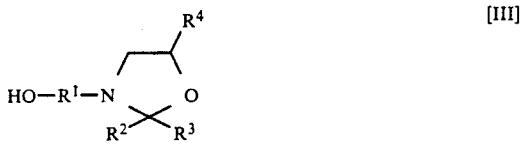

wherein $R_1$ to $R_4$ are same as in the formula [I]. This synthetic reaction is represented by the following equation:

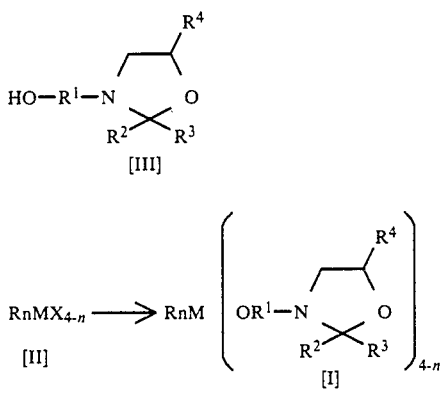

wherein R, n, M, X and $R^1$ to $R^4$ are same as in the formula [I].

The compounds represented by the above described formula [II] include halogenated silane compounds or halogentated titanium compounds. The halogenated silane compounds include methyltrichlorosilane, methyldichlorosilane, dimethyldichlorosilane, phenyltrichlorosilane, diphenyldichlorosilane, tetrachlorosilane, vinyltrichlorosilane, chloromethyltrichlorosilane, ethyltrichlorosilane, dimethoxymethylchlorosilane, diethoxydichlorosilane, triethoxychlorosilane and the like. The halogenated titanium compounds include tetrachlorotitanium and the like.

The hydroxyoxazolidine compounds represented by the above described formula [III] are obtained by the usual oxazolidine-synthesizing reaction, as mentioned later. Concrete examples of the hydroxyoxazolidine compounds [III] are 2-isopropyl-3-(2-hydroxypropyl)-5-methyloxazolidine, 2,2-dimethyl-3-(2-hydroxypropyl)-5-methyloxazolidine, 2-phenyl-3-(2-hydroxypropyl)-5-methyloxazolidine, 2-isopropyl-3-(2-hydroxyetyl)oxazolidine, 2-methyl-2-isobutyl-3-(2-hydroxyethyl-oxazolidine, 3-(2-hydroxypropyl)-5-methyloxazolidine and the like.

According to the method of the present invention, the above described compound [II] are reacted with the above described compound [III] for 1 to 5 hours at a reaction temperature of less than 30° C. in a nonpolar solvent in the presence of bases (e.g. pyridine and triethylamine) for trapping hydrochloric acid to obtain the compound [I]. There is the possibility that if the reaction temperature is higher than 30° C., the formed compounds [I] are decomposed, so that the reaction temperature of less than 30° C. is preferable.

An amount of the component (B) in the composition is 0.2 to 3 equivalent, preferably 0.5 to 2 equivalent, as measured as an amino group based on 1 equivalent of a carboxylic anhydride group in the component (A) If the amount of the component (B) is less than 0.2 equivalent, a good crosslinking degree is not obtained and thus the solvent resistance is insufficient. If the amount of the component (B) exceeds 3 equivalent, the weather resistance is reduced.

Component (C)

The polymers containing an alkoxysilyl group can be obtained by various kinds of method. A simple method is a method (1) in which silane compounds having a polymerizable double bond and an alkoxylic group (e.g. 3-methyacryloxypropyldimethoxymethylsilane and 3-methacryloxypropylmethoxysilane) are homopolymerized or copolymerized with other polymerizable compounds. Examples of the other polymerizable compounds are styrene monomers, α-methylstyrene and esters of acrylic acid or methacrylic acid (e.g. methylmethacrylate, metylacrylate, ethylmethacrylate, ethylacrylate, butylmethacrylate, butylacrylate, 2-ethylhexylmethacrylate and 2-ethylhexylmethacrylate). There also propose a method (2) in which polymers are modified with silane compounds. That is, allylmethacrylate (or allylacrylate) is copolymerized with the above described other polymerizable monomers, and then silane compounds having a Si-H group, such as dimethoxysilane, trimethoxysilane, triethoxysilane and dimethoxymethylsilane, are introduced into the copolymers by a silyl-hydration reaction in the presence of platinum-containing catalysts; a method (3) in which compounds having an unsaturated group and an isocyanate group are copolymerized with the above described other copolymerizable monomers, and then alkoxysilane compounds having —NH— (or —NH$_2$), such as 3-aminopropyltrimethyoxysilane, 3-aminopropyldimethylethoxysilane, 3-allylaminopropyltrimethoxysilane and 3-aminopropyltriethoxysilane compounds, are introduced into the copolymer by reacting them with the isocyanate group in the copolymers; or in which alkoxysilane compounds having a —SH group, such as mercaptomethyltrimethoxysilane, dimethoxy-3-mercaptopropylmethylsilane and 3-mercaptopropyltrimethoxysilane, are introduced in the copolymers by reacting them with the isocyanate group in the copolymers; and a method (4) in which for example glycidylmethacrylate (or methacrlic acid) is reacted with polymers containing a carboxylic group (or a glycidyl group) to introduce an unsaturated double bond into the polymers and the above described alkoxysilyl group containing —NH$_2$ group is introduced into the polymers by the Michel reaction. Of these methods, in particular the methods (1) and (2) are simple and advantageous.

An amount of the silyl compounds in the copolymer is not specially limited, but preferably 20 to 100%. If it is less than 20%, a problem occurs in curing properties. A molecular weight of this polymer is 500 to 40,000, preferably 1,000 to 20,000. If it is less than 500, a problem occurs in curing properties and has disadvantages in shedding and the like. If it exceeds 40,000, a high solid paint is hard to obtain and disadvantages occur in compatibility.

An amount of the alkoxysilyl group in the composition is 0.2 to 10 equivalents, preferably 0.5 to 5 equivalents, based on 1 mol of an oxazolidine group. If it is 0.2 equivalent or less, the curing properties are inferior and if it is 5 equivalent or more, the water resistance is inferior.

Component (D)

Compounds having at least one oxysilane group are used as the epoxy compounds. Such the epoxy compounds include glycidyl ethers, such as ethylene glycol diglycidyl ether, propylene glycol diglycidyl ether, 1,6-hexanediol glycidyl ether, trimethylolpropane triglycidyl ether, bisphenol A diglycidyl ether and hydrogenated bisphenol A-diglycidyl ether; glycidyl esters, such as diglycidyl ester of adipic acid, diglycidyl ester of hydrogenated phthalic acid, diglycidyl ester of phthalic acid, triglycidyl ester of trimellitic acid and the like; alicyclic epoxy compounds, such as 3,4-epoxycyclohexylmethyl-3,4-epoxycyclohexane carboxylate, bis-(3,4-epoxycyclohexyl)adipate, vinylcyclohexene dioxide; and the like. Also, products on the market, for example ERL-4221 (manufactured by UCC Corporation), ERL-4299 (manufactured by UCC Corporation), Epolite 1600 (manufacture by Kyoeisha Oils and Fats Co., Ltd.), Epolite 4000 (manufactured by Kyoeisha Oils and Fats Co., Ltd.) and the like, may be used. The component (D) can be contained in the composition in such an amount that an epoxy equivalent is 0.2 to 3 equivalent, preferably 0.5 to 1.0 equivalent, based on 1 mol of a carboxylic acid anhydride group in the above described component (A). If it is less than 0.2 equivalent, the curing properties are poor and if it exceeds 3 equivalent, weather resistance is reduced.

OTHER COMPONENTS

The curable composition according to the present invention may be used as a coating composition. The above described components may be mixed to form a clear coating composition. In addition, they may be mixed together with pigments to form paints. The modified polymer of the acid anhydride group, for example when modified with diethylaminoethanol, contains an acid and an amine in a molecule, whereby being amphoterized and exhibiting a secondary effect that the dispersion of pigments is improved. Any conventional pigments may be used, for example, iron oxide, lead oxide, strontium chromate, carbon black, coal dust, titanium dioxide, talc, barium sulfate, cadmium yellow, cadmium red, chromium yellow, metallic pigments (such as, aluminum flake) and the like. Also organic pigments may also be used. That is to say, for example phthalocyanine blue and the like may be used. Also pearl mica and the like may be used. An amount of the pigments contained in the paint is generally represented by a ratio by weight of the pigments to nonvolatile components in the coating composition. According to the present invention, the ratio of the pigments to nonvolatile components in the coating composition may be as high as 2:1, in many cases 0.05 to 1:1.

The coating composition of the curable composition may generally contain a liquid diluent. The liquid diluent is a solvent or nonsolvent which is removed after applying and which reduces the viscosity so that it is coated in a controlled thickness by a general coating method, such as spray coating and the like. The liquid diluent also assists wetting properties of a substrate, miscibility, package stability, coalescent properties and film-forming properties. Suitable examples of the diluents are an aromatic hydrocarbon, such as toluene and xylene; a ketone, such as methyl ethyl ketone and methyl isobutyl ketone; an secondary or tertiary alcohol, such as isopropyl alcohol and sec-butyl alcohol; a monoether of glycol, such as ethyleneglycol monoether and diethyleneglycol monoether; a monoether glycol acetate, such as 2-ethoxyethyl acetate; and a suitable mixture thereof. The diluent may be present in the coating composition in an amount of up to 60% by weight, generally 20 to 55% by weight based on the total amount of the diluent and the nonvolatile content of the coating composition.

Beside the above components, an additive, such as filler, a plasticizer, an antioxidation agent, a ultraviolet absorber, a flow controlling agent, a surfactant and the like can be added, if desirable. An amount of the additive is varied widely, generally up to 10% by weight based on the nonvolatile content of the coating composition.

The coating composition may be applied on a substrate by spray coating, blushing, dipping, roll coating, flow coating and the like. The substrate to be employed includes wood, metal, glass, fabric, plastics, foam or various primer-coated substrate. The coating composition is very suitable for plastics or metal, such as steel and aluminum. A thickness of film can be varied, but generally is 0.5 to 3 mil. After the coating composition has been applied, it is cured. Curing can be carried at a temperature of 100° to 200° C., preferably 120° to 180 ° C. for 10 to 30 minutes.

The curable composition according to the present invention may be used for molding and other applications.

According to the present invention, the polymer having an alkoxysilyl group is added to the compound having an acid anhydride group and the oxazolidine compound to give the improved solvent resistance, chemical resistance and durability to the curable composition. In addition, if the composition is coated, the good flatness is obtained. It seems that it is the reason why such the superior effects are obtained that a hydroxylic group formed by a hydrolysis of oxazolidine is reacted with the polymer containing an alkoxysilyl group and the acid anhydride group to form crosslinks. In the case where the epoxy compound (D) is contained, it seems that this epoxy compound further contributes to the crosslink.

EXAMPLES

The present invention will be illustrated by the following examples which, however, are not construed as limiting the present invention to their details.

PRODUCTION EXAMPLE 1

120 parts by weight of butyl acetate was charged in a reaction vessel having a capacity of 1 l provided with a thermometer, a stirrer, a condenser and a nitrogen-introducing pipe, and heated up to 100° C. A solution containing 21 parts by weight of n-butyl acrylate, 95 parts by weight of n-butyl methacrylate, 34 parts by weight of 2-ethylhexyl methacrylate, 45 parts by weight of itaconic anhydride, 60 parts by weight by dioxane and 20 parts by weight of t-butylperoxyhexanoate was added dropwise for 3 hours and stirring was continued for 2 hours to obtain an acrylic resin solution having a nonvolatile content of 51% and a number average molecular weight of 2,500.

PRODUCTION EXAMPLES 2 TO 5

Synthesis of Polymers II to V Containing a Carboxylic Anhydride Group

Polymers containing a carboxylic anhydride group were obtained in the same manner as in Production Example 1 using ingredients shown in Table 1.

TABLE 1

|  | Production Examples | | | |
|---|---|---|---|---|
|  | 1 | 2 | 3 | 4 |
| Butyl acetate | 100 | 100 | 100 | — |
| Xylene | 20 | — | 20 | 120 |
| Butylene | 10 | — | 50 | — |
| Methyl methacrylate | — | — | 35 | — |
| Butyl acrylate | 80 | 80 | 30 | 165 |
| 2-Ethylhexyl methacrylate | 45 | 45 | 15 | — |
| Ethyl methacrylate | 15 | — | — | — |
| Ethyl acrylate | — | 15 | 25 | — |
| Itaconic anhydride | 45 | 55 | — | — |
| Maleic anhydride | — | — | 30 | 30 |
| Dioxane | 50 | 70 | 50 | 50 |
| t-Butylperoxy-2-ethylhexanoate | 7 | — | — | 7 |
| AIBN* | — | 1.5 | 8 | — |
| Nonvolatile content | 52 | 52 | 52 | 52 |
| Number average molecular weight | 7,000 | 15,000 | 4,000 | 7,000 |

*AIBN: azobisisobutylonitryl

PRODUCTION EXAMPLE 6

76 g of isobutylaldehyde was added dropwise to 133 g of diisopropanolamine and 70 g of toluene charged in a reaction vessel provided with a stirrer, a condenser having a water separator and a thermometer for 1 hour with cooling by means of ice. The reaction was continued for 5 hours with separating and removing water under reflux. Subsequently, the water separator was removed and 84 g of 1,6-hexane diisocyanate and 20 g of xylene were added dropwise to the above described reaction product at room temperature for 1 hour followed by continuing the reaction for 8 hours at 70° to 80° C. to obtain a blocked amine compound I which was blocked in the form of an oxazolidine group.

PRODUCTION EXAMPLE 7 TO 9

Blocked amine compounds II to IV were obtained under the same conditions as in Production Example 6 using ingredients shown in Table 2.

TABLE 2

|  | Production Examples | | |
|---|---|---|---|
|  | 7 | 8 | 9 |
| Toluene | 90 | 90 | 90 |
| Diethanolamine | 105 | — | — |
| N-methylisopropanolamine | — | 89 | — |
| Diisopropanolamine | — | — | 133 |
| Cyclohexanone | 98 | — | — |
| Isobutylaldehyde | — | 72 | 72 |
| 1,6-Hexane diisocyanate | 168 | — | — |
| TAKENATE XD-170HN* | — | — | 183 |
| Blocked amine compound | II | III | IV |

*Polyisocyanate manufactured by Takeda Chemical Industries, Co., Ltd.

PRODUCTION EXAMPLE 10

Synthesis of Blocked Amine Compound V 72 g isobutylaldehyde was added dropwise to 70 g of toluene and 75 g of 3-amino-1-propanol charged in the same apparatus as in Production Example 6 at room temperature within 1 hour. The reaction was continued for further 5 hours with separating and removing water under reflux to obtain tetrahydro-1,3-oxazone compound. Subsequently, the water separator was removed and 99 g of ethyleneglycol dimethacrylate and 20 g of xylene were added to the above described reaction product followed by the reaction for 48 hours at 60° to 70° C. to obtain a blocked amine compound V.

PRODUCTION EXAMPLE 11

Synthesis of a polymer I Containing an Alkoxysilyl Group 200 g of xylene was charged in a reaction vessel similar to that in Production Example 1 and heated up to 120° C. A solution containing 150 g of 3-methcryloxy-propyltrimethoxysilane, 20 g of n-butyl acrylate, 30 g of methyl methacrylate and 15 g of t-butylperoxyhexanoate was added dropwise to the reaction vessel for 3 hours followed by continuing the reaction for further 2 hours to obtain a polymer I containing an alkoxysilyl group (nonvolatile content=52% and number average molecular weight=2,000).

PRODUCTION EXAMPLE 12

Synthesis of a Polymer II Containing an Alkoxysilyl Group

A polymer containing an alkoxysilyl group II (nonvolatile content=51% and number average molecular weight=12,000) was obtained from 200 g of xylene, 100 g of 3-methacryloxypropyldiethoxymethylsilane, 25 g of n-butyl acrylate, 50 g of styrene, 25 g of methyl methacrylate and 3 g of t-butylperoxyhexanoate in the same manner as in Production Example 11.

PRODUCTION EXAMPLE 13

Synthesis of a Polymer III Containing an Alkoxysilyl Group 200 g of xylene was charged in the same reaction vessel as in Production Example 11 and heated up to 120° C. A solution containing 80 g of isocyanatoethyl methacrylate, 50 g of n-butyl acrylate, 40 g of styrene, 30 g of ethyl methacrylate and 10 g of t-butylperoxyhexanoate was added dropwise to the reaction vessel for 3 hours followed by continuing the reaction for further 2 hours to obtain a polymer containing isocyanate groups. 115 g of 3-aminopropyltriethoxysilane was added thereto dropwise for 1 hour with cooling by means of ice followed by continuing the reaction for further 5 hours at room temperature to obtain a polymer III containing an alkoxysilyl group (nonvolatile content=61% and number average molecular weight=4,000).

EXAMPLE 1

A clear paint was prepared from the following ingredients and the resulting coated film was evaluated in performance.

| | |
|---|---|
| Compound I containing a carboxylic acid anhydride | 130 g |
| Blocked amine compound I | 25 g |
| Compound I containing an alkoxysilyl group | 1.5 g |
| Tinuvin 900 | 1.5 g |
| Ilganox 1010 | 1.0 g |

The obtained clear paint was diluted with a thinner comprising butyl acetate and xylene in a ratio of 1:1 until a paint viscosity was obtained. A phosphated steel panel was coated with Powertop U-30 and Orga P-2 manufactured by Nippon Paint Co., Ltd. and then coated with a metallic base Superlac H-90 manufactured by Nippon Paint Co., Ltd. The resultant panel was then coated with the above mentioned clear paint in a wet-on-wet manner and baked for 30 minutes at 140° C. The results of the evaluation of the coated film are shown in Table 4.

EXAMPLE 2

TO 6

Clear paints were obtained from the ingredients shown in Table 3 in the same manner as in Example 1. The results of the evaluation of the coated film are shown in Table 4.

COMPARATIVE EXAMPLE 1

A clear paint was obtained from the ingredients shown in Table 3. The results of the evaluation of the coated film are shown in Table 4.

Acid resistance: 6 drops of 6%-sulfurous acid are dropped on the coated film and the change after the lapse of 24 hours is observed.

Alkali resistance: 6 drops of a 6.1 N-aqueous solution of NaOH are dropped on the coated film and the change after the lapse of 24 hours is observed.

XL rubbing: A gauze impregnated with xylene is reciprocated on the coated film 8 times and the change is observed.

MEK spot: 6 drops of methylethyl on the coated film and the change after the lapse of 3 minutes is observed.

o: No change.

Δ: Shaded-off gloss, change of color.

x: Separation or dissolution.

PRODUCTION EXAMPLE 14

Synthesis of Oxazolidine Compound I 76 g of isobutylaldehyde was added dropwise to 133 g of diisopropanolamine and 70 g of toluene charged in a reaction vessel provided with a stirrer, a condenser having a water separator and a thermometer within 1 hour with cooling by means of ice. The reaction was continued for further 5 hours with separating and removing water under reflux and the water separator was removed. Subsequently, 84 g of 1,6-hexanediisocyanate and 20 g of xylene were added dropwise to the above described reaction product within 1 hour at room temperature followed by conducting the reaction for 8 hours at 70° to 80° C. to obtain an oxazolidineamine compound I.

PRODUCTION EXAMPLE 15

TO 17

Synthesis of Oxazolidine Compounds II to IV

Oxazolidine compounds II to IV were obtained from materials shown in Table 5 under the same conditions as in Production Example 7.

TABLE 3

| | Polymer containing carboxylic anhydride | Blocked amine compound | Polymer containing alkoxysilyl group | Additives |
|---|---|---|---|---|
| Example 2 | Pro. Ex. 2, 130 g | Pro. Ex. 7, 35 g | Pro. Ex. 11, 60 g | Seasope 103 1.0 g Sanol LS-292 0.8 g |
| Example 3 | Pro. Ex. 3, 100 g | Pro. Ex. 8, 30 g | Pro. Ex. 12, 80 g | Tinuvin 900 1.0 g Sanol LS-292 1.0 g |
| Example 4 | Pro. Ex. 4, 150 g | Pro. Ex. 9, 23 g | Pro. Ex. 11, 30 g | Tinuvin 900 1.0 g Sanol LS-292 1.0 g |
| Example 5 | Pro. Ex. 5, 145 g | Pro. Ex. 9, 20 g | Pro. Ex. 11, 40 g | Tinuvin 900 1.0 g Sanol LS-292 1.0 g |
| Example 6 | Pro. Ex. 1, 130 g | Pro. Ex. 10, 45 g | Pro. Ex. 11, 40 g | Tinuvin 900 1.2 g Sanol LS-292 0.8 g |
| Comparative Example 1 | Pro. Ex. 5, 145 g | Pro. Ex. 9, 20 g | — | Tinuvin 900 1.0 g Sanol LS-292 1.0 g |

TABLE 4

| | Chemical resistance | | Solvent resistance | |
|---|---|---|---|---|
| | Acid | Alkali | XL rubbing | MEK spot |
| Example 1 | o | o | o | o |
| Example 2 | o | o | o | o |
| Example 3 | o | o | o | o |
| Example 4 | o | o | o | o |
| Example 5 | o | o | o | o |
| Example 6 | o | o | o | o |
| Comparative Example 1 | x | o | o | Δ |

TABLE 5

| | Production Example No. | | |
|---|---|---|---|
| | 15 | 16 | 17 |
| Toluene | 90 | 90 | 90 |
| Diethanolamine | 105 | — | — |
| N-methylisopropanolamine | — | 89 | — |
| Diisopropanolamine | — | — | 133 |
| Cyclohexanone | 98 | — | — |
| Isobutylaldehyde | — | 72 | 72 |
| 1,6-Hexane diisocyanate | 168 | — | — |
| Takenate XD-170HN* | — | — | 183 |
| Oxazolidine compound | II | III | IV |

*Polyisocyanate manufactured by Takeda Chemical Industries. Co., Ltd.

PRODUCTION EXAMPLE 18

Synthesis of an Oxazolidine Compound V 75 g of isobutylaldehyde was added dropwise to 200 g of benzene and 133 g of diisopropanolamine charged in the same reaction vessel as in Production Example 14 for 90 minutes at room temperature. The reaction was continued for further 5 hours with separating and removing water under reflux followed by removing benzene under a reduced pressure to obtain a hydroxyoxazolidine compound.

After removing the water separator, 1,000 g of hexane and 103 g of triethylamine were added and then 64.6 g of dicholorodimethysilane was added dropwise for 2 hours at 0° C. followed by stirring for further 2 hours at room temperature to deposit solid substances from the reaction solution and filtrate the resulting solid substances. The filtrate was concentrated to obtain an oxazolidine compound V.

PRODUCTION EXAMPLE 19

Synthesis of an Oxazolidine Compound VI

An oxazolidine compound VI was obtained in the same manner as in Production Example 18 excepting that 42.5 g of tetrachlorosilane was used in place of 64.6 g of dichlorodimethylsilane.

PRODUCTION EXAMPLE 20

Synthesis of an Oxazolidine Compound VII

An oxazolidine compound VII was obtained in the same manner as in Production Example 18 excepting that 134 g of dichloride dodecanate was used in place of 64.6 g of dichlorodimethylisilane.

EXAMPLE 7

A clear paint was prepared in the following composition and the evaluation of the performance of the obtained coated film was conducted.

| | |
|---|---|
| Compound 1 containing a carboxylic anhydride | 130 g |
| Oxazolidine compound V | 13 g |
| Compound I containing an alkoxysilyl group | 65 g |
| 3,4-Epoxycyclohexylmethyl-3,4-epoxycyclohexane carboxylate | 7 g |
| Tinuvin 900 | 1.5 g |
| Ilganox 1010 | 1.0 g |

A phosphated steel plate was coated as generally described in Example 1 with the exception that the above described clear paint is employed. The results of the evaluation of the coated film are shown in Table 7.

EXAMPLE 8

TO 16

Clear paints were obtained in the compositions shown in Table 6 in the same manner as in Example 7. The results of the evaluation of the coated film are shown in Table 7.

COMPARATIVE EXAMPLE 2

A clear paint was obtained in the composition shown in Table 6. The result of the evaluation of the coated film is shown in Table 7.

TABLE 6

| | Compound containing a carboxylic anhydride group | Oxazolidine compound | Polymer containing an alkoxysilyl group | Epoxy compound | Additive |
|---|---|---|---|---|---|
| Example 8 | Pro. Ex. 1, 130 parts | Pro. Ex. 14, 30 parts | Pro. Ex. 11, 60 parts | *1 7 parts | Seasope 103, 1.0 parts Sanol LS-292, 0.8 parts |
| Example 9 | PRo. Ex. 2, 130 parts | Pro. Ex. 15, 20 parts | Pro. Ex. 12, 50 parts | *1 8 parts | Tinuvin 900, 1.0 parts Sanol LS-292, 1.0 parts |
| Example 10 | Pro. Ex. 3, 110 parts | Pro. Ex. 16, 30 parts | Pro. Ex. 13, 40 parts | *2 10 parts | Tinuvin 900, 1.0 parts Sanol LS-292, 1.0 parts |
| Example 11 | Pro. Ex. 4, 150 parts | Pro. Ex. 17, 20 parts | Pro. Ex. 11, 90 parts | *3 6 parts | Tinuvin 900, 1.2 parts Ilganox 1010, 1.0 parts |
| Example 12 | Pro. Ex. 1, 130 parts | Pro. Ex. 18, 45 parts | Pro. Ex. 11, 60 parts | *4 8 parts | Tinuvin 900, 1.2 parts Ilganox 1010, 1.0 parts |
| Example 13 | Pro. Ex. 3, 110 parts | Pro. Ex. 19, 25 parts | Pro. Ex. 12, 70 parts | *4 10 parts | Tinuvin 900, 1.0 parts Ilganox 1010, 1.0 parts |
| Example 14 | Pro. Ex. 5, 145 parts | Pro. Ex. 20, 35 parts | Pro. Ex. 11, 50 parts | *1 5 parts | Tinuvin 900, 1.0 parts Ilganox 1010, 1.0 parts |
| Example 15 | Pro. Ex. 1, 130 parts | Pro. Ex. 19, 26 parts | Pro. Ex. 11, 50 parts | *1 10 parts | Tinuvin 900, 1.0 parts Ilganox 1010, 1.0 parts |
| Example 16 | Pro. Ex. 1, 130 parts | Pro. Ex. 19, 8 parts | Pro. Ex. 11, 70 parts | *1 12 parts | Tinuvin 900, 1.0 parts Ilganox 1010, 1.0 parts |
| Comparative Example 2 | Pro. Ex. 5, 145 parts | Pro. Ex. 17, 20 parts | — | — | Tinuvin 900, 1.0 parts Ilganox 1010, 1.0 parts |

*1: 3,4-epoxycyclohexylmethyl-3,4-epoxycyclohexane carboxylate
*2: 1,6-hexanediol-diglycidylether
*3: ethyleneglycoldiglycidylether
*4: bis(3,4-epoxycyclohexyl)adipate

TABLE 7

| | Chemical resistance | | Solvent resistance | | Water-Proofness |
|---|---|---|---|---|---|
| | Acid | Alkali | XL rubbing | MEK spot | |
| Example 7 | o | o | o | o | o |
| Example 8 | o | o | o | o | o |
| Example 9 | o | o | o | o | o |
| Example 10 | o | o | o | o | o |
| Example 11 | o | o | o | o | o |
| Example 12 | o | o | o | o | o |
| Example 13 | o | o | o | o | o |
| Example 14 | o | o | o | o | |
| Example 15 | o | o | o | o | o |
| Example 16 | o | o | o | o | o |
| Comparative Example 2 | x | o | o | Δ | Δ |

Acid resistance: 6 drops of a 6%-aqueous solution of sulfurous acid are dropped on the coated film and a change after the lapse of 24 hours is observed.

Alkali resistance: 6 drops of a 6.1 N-aqueous solution of NaOH are dropped on the coated film and a change after the lapse of 24 hours is observed.

XL rubbing: A gauze impregnated with xylene is reciprocated on the coated film 8 times and a change is observed.

MEK spot: 6 drops of methylethylketnone are dropped on the coated film and a change after the lapse of 3 minutes is observed.

Water-proofness A change after the immersion in water for 10 days at 50° C. is observed.

What is claimed is:

1. A curable composition comprising
   (A) a carboxylic anhydride group containing compound;
   (B) an oxazolidine compound; and
   (C) an alkoxysilyl group containing polymer.

2. The curable composition according to claim 1 wherein said compound (A) is a polymeric compound or a monomeric compound.

3. The curable composition according to claim 1 wherein said compound (A) is an ester of trimellitic anhydride and ethylene glycol, or an ester of glycerol and trimellitic anhydride.

4. The curable composition according to claim 1 wherein said oxazolidine compound (B) is present in the composition in such an amount that an amino group produced from the oxazolidine compound (B) is 0.2 to 3 equivalent based on one equivalent of the carboxylic anhydride group.

5. The curable composition according to claim 1 wherein said oxazolidine compound (B) is represented by the following formula:

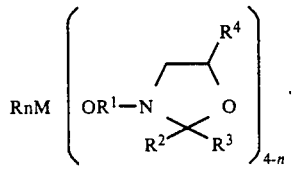

[I]

wherein R is a hydrogen atom or an alkyl group, aryl group, vinyl group, halogenated alkyl group or alkoxylic group containing 1 to 10 carbon atoms; n is an integer of 0 to 3; M is a silicon or titanium atom; $R^1$ is an alkyl group containing 2 to 5 carbon atoms; $R^2$ and $R^3$ is a hydrogen atom or an alkyl group or aryl group containing 1 to 10 carbon atoms, respectively; and $R^4$ is a hydrogen atom or a methyl group.

6. The curable composition according to claim 1 wherein said polymer (C) is present in the composition in such an amount that an alkoxysilyl group is 0.2 to 10 equivalent based on one mol of an oxazolidine group.

7. The curable composition according to claim 1 which further contains (D) a glycidyl ether, a glycidyl ester or an alicyclic epoxy compound.

8. The curable composition according to claim 7 wherein said epoxy compound (D) is present in the composition in such an amount that an epoxy group is 0.2 to 3 equivalent based on one equivalent of a carboxylic anhydride group.

9. The curable composition according to claim 1 wherein said compound (A) is a low molecular weight acid anhydride or a high molecular weight acid anhydride.

10. The curable composition according to claim 9 wherein compound (A) is selected from the group consisting of maleic anhydride, phthalic anhydride, hydrogenated phthalic anhydride, 4-methyl-hydrogenated phthalic anhydride, pyromellitic anhydride, triglyceride of pyromellitic anhydride, ethyleneglycol ester of trimellitic anhydride and mixtures thereof, homopolymers of ethylenic anhydrides and copolymers of ethylenic anhydrides and other copolymerizable monomers, and component (C) is a homopolymer of 3-methyacryloxypropyldimethoxymethylsilane, a homopolymer of 3-methacryloxypropylmethoxysilane, a copolymer of 3-methyacryloxypropyldimethoxymethylsilane, and other copolymerizable monomers and a copolymer of 3-methacryloxypropylmethoxysilane and other copolymerizable monomers.

11. The curable composition according to claim 10 wherein the oxazolidine compound (B) is represented by the following formula:

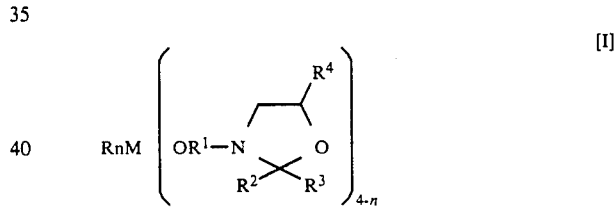

[I]

wherein r is a hydrogen atom or an alkyl group, aryl group, vinyl group, halogenated alkyl group or alkoxylic group containing 1 to 10 carbon atoms; n is an integer of 0 to 3; M is a silicon or titanium atom; $R^1$ is an alkyl group containing 2 to 5 carbon atoms; $R^2$ and $R^3$ is a hydrogen atom or an alkyl group or aryl group containing 1 to 10 carbon atoms, respectively; and $R^4$ is a hydrogen atom or a methyl group.

* * * * *